United States Patent Office 2,759,943
Patented Aug. 21, 1956

2,759,943

DERIVATIVES OF 2-N-METHYL-1,2,3,4-TETRA-HYDRO-GAMMA-CARBOLINES

Ulrich Horlein, Wuppertal-Vohwinkel, Germany, assignor to Schenley Industries, Inc., New York, N. Y., a corporation of Delaware No Drawing. Application June 4, 1953,
Serial No. 359,643

Claims priority, application Germany April 30, 1951

6 Claims. (Cl. 260—294.8)

The present invention relates generally to the synthesis of organic chemical compounds and, more particularly, it is concerned with the synthesis of certain derivatives of 2-N-methyl-1:2:3:4-tetrahydro-γ-carboline, which are substituted at the 5-nitrogen atom, and to processes for preparing these compounds.

It is known that 2-N-methyl-1:2:3:4-tetrahydro-γ-carbolines can be obtained by reacting phenylhydrazine hydrochloride and 1-N-methyl-4-piperidone, and that this reaction proceeds through the formation of 1-methyl-4-piperidone phenylhydrazone, which, when digested on the steam bath with aqueous sulfuric acid, yields the substituted γ-carboline, in accordance with reactions that may be indicated as follows:

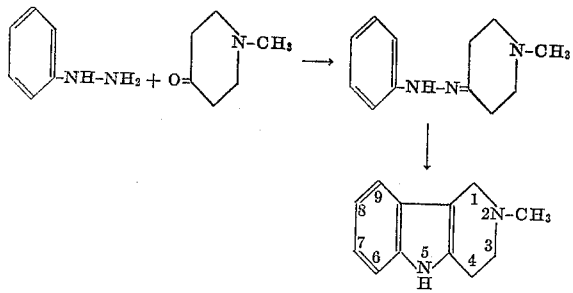

In accordance with this invention, it is now found that γ-tetrahydrocarbolines, substituted at the bridge 5-position nitrogen atom connecting the phenyl and piperidine rings, can be prepared by methods described hereinafter, and that the compounds thus produced are therapeutically useful.

The compounds of this invention are derivatives of 2-N-methyl-1:2:3:4-tetrahydro-γ-carboline that are represented by the formula:

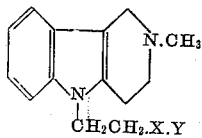

wherein X is either an oxygen atom or a sulfur atom and Y is a lower alkyl radical comprising at most 4 carbon atoms.

In accordance with this invention, these compounds may be prepared by various routes of synthesis. 5-N-substituted 1:2:3:4-tetrahydro-γ-carbolines can be obtained by reaction of α-substituted phenylhydrazines with salts of 1-N-alkyl-4-piperidones in aqueous or alcoholic media and preferably in the presence of mineral acid condensation-promoting agents. The intermediate phenylhydrazones may be isolated, if desired, but this is unnecessary. It is also possible to replace the active hydrogen atom at the 5-imino-nitrogen atom of γ-carboline with an atom of an alkali metal, such as sodium, potassium or lithium, or with the Grignard magnesium bromide radical (—MgBr), and subsequently to react the resulting compound with an alkyl, aminoalkyl, aryl or aralkyl halide or a reactive ester of a suitably selected alcohol corresponding to the substituent group that it is desired to introduce. The carboline bases of the present invention, mostly, are distillable under high vacuum; some of them show a strong tendency to crystallize.

The compounds of the present invention, particularly 2 - N - methyl - 5 - N - ethylmercaptoethyl - 1:2:3:4-tetrahydro - γ - carboline, and 2 - N - methyl - 5-N - β - isopropoxyethyl - 1:2:3:4 - tetrahydro - carboline, are especially distinguished by their prolonged antihistaminic activity, which is unexpected inasmuch as 2-N-methyl-1:2:3:4-tetrahydro-γ-carboline, a closely related compound, has no antihistaminic activity. For therapeutic use, the compounds may be administered in the form of their readily crystallized common mineral or simple organic acid salts.

The following examples, which describe the preparation of certain compounds conforming to the general formula of the invented products above set forth, are merely intended to be illustrative of the invention, and are not to be construed in terms of limitation or restriction.

*Example 1*

Synthesis of the compound represented by the formula:

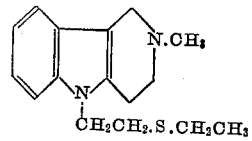

About 1 mole of aniline and 1 mole of β-chloroethyl ethyl sulfide are heated, with stirring, at 110° C. An exothermic reaction sets in, which is allowed to subside, and after cooling, the residual material is dissolved in water, made alkaline, extracted with ether and the ethereal extract distilled. The boiling point of the reaction product, N-ethylmercaptoethyl aniline, at a pressure of 10 millimeters of mercury is 138–143° C. and it is obtained in a yield of about 75% of theoretical.

N-ethylmercaptoethyl aniline is converted into the nitroso compound by treatment with nitrous acid and this product is then converted by catalytic hydrogenation, into N-ethylmercaptoethyl-N-phenylhydrazine (boiling point, 173–180° C. at 8 mm. Hg). One mole of the N-ethylmercaptoethyl-N-phenyl-hydrazine is dissolved in alcohol saturated with hydrogen chloride and mixed with 1 mole of N-methyl-4-piperidone hydrochloride. The mixture is heated to its boiling point on a water bath for 3 hours, then it is cooled, filtered to remove ammonium chloride, the filtrate is mixed with water, and the alcohol distilled off in vacuo. The solution is made alkaline and extracted with ether. Upon evaporation of the ether, 2-N-methyl-5-N-ethylmercaptoethyl-1:2:3:4-tetrahydro-γ-carboline is obtained as the residue. It boils at 190–206° C. under a pressure of 1 millimeter of mercury and yields a maleate melting at 138° C. Yield: approximately 70% of theoretical.

*Example 2*

Synthesis of the compound represented by the formula:

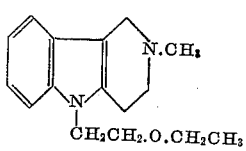

N-β-ethoxyethylaniline is converted by known methods to the corresponding nitroso compound which, in turn, is converted into N-phenyl-N-β-ethoxyethyl hydrazine (boiling point at a pressure of 5 millimeters of mercury, 136–142° C.).

N-phenyl-N-β-ethoxyethyl hydrazine is reacted with N-methyl-4-piperidone hydrochloride by reactions analogous to these described in Example 1. The resultant product, 2-N-methyl-5-β-ethoxyethyl-1:2:3:4-tetrahydro-γ-carboline, boils at 170°–180° C. at a pressure of 0.5 millimeter of mercury and is obtained in a yield of 60–70% of theory. The melting point of its maleate is 141–142° C.

*Example 3*

Synthesis of the compound represented by the formula:

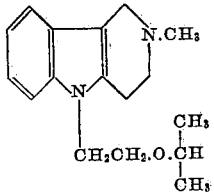

About 1 mole of β-bromoethyl isopropyl ether is reacted with 2 moles of aniline to yield isopropyloxyethyl-aniline (boiling point, 135° C. at a pressure of 5 millimeters of mercury). Introduction of a nitroso group by treatment with nitrous acid and reduction of this nitroso compound according to known methods yield N-phenyl-N-β-isopropyloxyethyl hydrazine (boiling point at a pressure of 5 millimeters of mercury, 138–145° C.), which can be converted into 2-N-methyl-5-N-β-isopropyloxyethyl-1:2:3:4-tetrahydro-γ-carboline, in a 68% yield, by reaction with N-methyl-4-piperidone hydrochloride. This product boils, under a pressure of 0.1 millimeter of mercury, at 165–175° C. and the melting point of its maleate is 175–176° C.

*Example 4*

Synthesis of the compound represented by the formula:

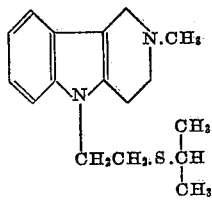

About 1 mole of monothioglycol (mercaptoethanol, HOCH₂CH₂SH) is introduced into a solution of 23 grams of sodium in 230 cubic centimeters of absolute alcohol, then 122 grams of isopropyl bromide is instilled into the boiling solution, and boiling is continued for 1 hour. After cooling, the resultant sodium chloride by-product is removed by vacuum filtration and the filtrate is distilled, yielding β-isopropylmercaptoethanol having a boiling point of 65–70° C. at a pressure of 17 millimeters of mercury. Yield: 72% of theoretical. From this product, β-isopropylmercaptoethyl chloride having a boiling point of 60–62° C. at 17 mm. Hg. is obtained by instillation of the calculated amount of thionyl chloride. Yield: 85–90%. When reacted with aniline, this product yields N-isopropylmercaptoethyl aniline (boiling point at a pressure of 5 millimeters of mercury, 146–149° C.). By introduction of a nitroso group through treatment of this product with nitrous acid, followed by reduction, N-phenyl-N-β-isopropylmercaptoethyl-hydrazine (boiling point at a pressure of 4 millimeters of mercury, 162–165° C.) is obtained. This product is condensed with N-methyl-4-piperidone hydrochloride to form 2-N-methyl-5-β-isopropylmercaptoethyl-1:2:3:4-tetrahydro-γ-carboline boiling at 190–210° C. under a pressure of 0.6 millimeter of mercury. The melting point of its picrate is 199–200° C.

*Example 5*

Synthesis of the compound represented by the formula:

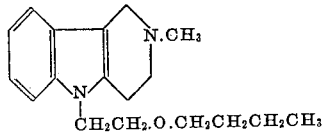

About 1 mole of n-butyl β-bromoethyl ether is reacted with 2 moles of aniline. The boiling point of the resultant N-n-butyloxyethyl-aniline is 150–158° C. at a pressure of 5 millimeters of mercury. This product is converted, by way of the corresponding nitroso compound followed by reduction, into N-phenyl-N-n-butyloxyethyl hydrazine, which boils at 156–163° C., at a pressure of 4–5 millimeters of mercury. Reaction of this product with N-methyl-4-piperidone hydrochloride yields 2-N-methyl - 5 - β - n - butyloxyethyl - 1:2:3:4 - tetrahydro-γ-carboline. The melting point of its naphthalene-1:5-disulfonate is 234° C. and the yield of this latter substance amounts to approximately 68% of the theoretical.

*Example 6*

Snythesis of the compound represented by the formula:

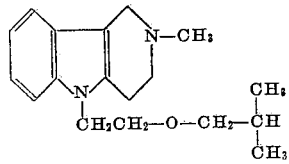

N-isobutyloxyethyl aniline (boiling point, 145–151° C. at a pressure of 5 millimeters of mercury) is converted into N - phenyl-N-isobutyloxyethyl hydrazine (boiling point, at a pressure of 5 millimeters of mercury, 148–156° C.), and this product is condensed with N-methyl-piperidone hydrochloride to yield 2-N-methyl-5-β-isobutyloxyethyl-1:2:3:4-tetrahydro-γ-carboline, the naphthalene-1:5-disulfonate of which melts at 235–236° C. The yield of this latter substance amounts to 60–70% of the theoretical.

*Example 7*

Synthesis of the compound represented by the formula:

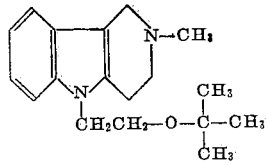

According to known methods, β-tertiary-butyloxyethanol (boiling point, 150-156° C.) is obtained from tertiary butanol and ethylene oxide, and it, in turn, is converted by known methods into β-tertiary-butyloxyethyl bromide (boiling point, at a pressure of 150 millimeters of mercury, 85–95° C.). This intermediate product is converted, by known methods, into N-β-tertiary-butyloxyethylanilime (B. P.₄: 130–140° C.) and thence into N-phenyl - N - β - tertiary-butyloxyethyl hydrazine (B. P.₄: 135–145° C.). By reaction of this product with N-methyl - 4 - piperidone hydrochloride, 2-N-methyl-5-β-tertiary-butyloxyethyl-1:2:3:4-tetrahydro-γ-carboline is obtained, the maleate of which melts at 169–170° C. The yield of this latter substance amounts to about 60–70% of the theoretical.

Although each of the compounds above described is chemotherapeutically useful as a histamine antagonistic substance, certain of these compounds are so outstandingly potent for this purpose, relative to the others, as to place them in a group apart, namely, 2-N-methyl-5-N-β-ethoxyethyl-1:2:3:4-tetrahydro-carboline, 2-N-methyl-5-N - β - isobutoxyethyl-1:2:3:4-tetrahydro-carboline, 2-N-methyl-5-N-β-n-butoxyethyl-1:2:3:4-tetrahydro-carboline, 2-N-methyl-5-N-β-ethylmercaptoethyl-1:2:3:4-tetrahydro-carboline, and 2-N-methyl-5-N-β-isopropoxyethyl-1:2:3:4-tetrahydro-carboline.

This application is a continuation-in-part of copending application Serial Number 283,990, filed April 23, 1952 and entitled, "Chemical Compounds and Processes for Making Same," now abandoned.

Having thus described the subject matter of this invention, what it is desired to secure by Letters Patent is:

1. A chemical compound represented by the formula:

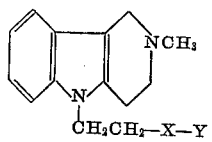

wherein X is a divalent atom chosen from the group consisting of oxygen and sulfur and Y is a lower alkyl radical comprising at most 4 carbon atoms.

2. A chemical compound as defined in claim 1 wherein X is sulfur and Y is ethyl.

3. A chemical compound as defined in claim 1 wherein X is sulfur and Y is isopropyl.

4. A chemical compound as defined in claim 1 wherein X is oxygen and Y is ethyl.

5. A chemical compound as defined in claim 1 wherein X is oxygen and Y is isopropyl.

6. A chemical compound as defined in claim 1 wherein X is oxygen and Y is iso-butyl.

References Cited in the file of this patent

UNITED STATES PATENTS

| 2,048,622 | Pyman et al. | July 21, 1936 |
| 2,642,438 | Duschinsky | June 16, 1953 |

OTHER REFERENCES

Robinson et al.: Chem. Abst., vol. 19, p. 507 (1925).
Leonard: J. Org. Chem., vol. 7, pp. 556–72 (1942).
Groves: J. Chem. Soc. 1952, pp. 650–61.